US006663549B2

(12) United States Patent
van Haag

(10) Patent No.: US 6,663,549 B2
(45) Date of Patent: Dec. 16, 2003

(54) DEFLECTION CONTROLLED ROLL WITH FORCE GENERATING DEVICE

(75) Inventor: Rolf van Haag, Kerken (DE)

(73) Assignee: Voith Paper Patent GmbH, Heidenheim (DE)

( * ) Notice: Subject to any disclaimer, the term of this patent is extended or adjusted under 35 U.S.C. 154(b) by 7 days.

(21) Appl. No.: 09/973,772

(22) Filed: Oct. 11, 2001

(65) Prior Publication Data

US 2002/0045522 A1 Apr. 18, 2002

(30) Foreign Application Priority Data

Oct. 11, 2001 (DE) .......................................... 100 50 596

(51) Int. Cl.[7] ................................................ B23P 15/00
(52) U.S. Cl. ................................ 492/16; 492/7; 492/20; 492/2
(58) Field of Search .............................. 492/2, 6, 7, 16, 492/20; 162/358.3, 272; 100/162 B

(56) References Cited

U.S. PATENT DOCUMENTS

| 4,035,038 | A | * | 7/1977 | Hinchcliffe et al. ......... 384/117 |
| 4,837,907 | A | * | 6/1989 | Roerig et al. .................. 492/7 |
| 4,852,229 | A | * | 8/1989 | Crouse .......................... 492/7 |
| 4,864,703 | A | * | 9/1989 | Biondetti et al. .............. 492/16 |
| 5,193,258 | A | * | 3/1993 | Brown ........................... 492/7 |
| 5,788,619 | A | * | 8/1998 | Brown et al. ................... 492/7 |
| 5,885,201 | A | * | 3/1999 | Brown et al. ................... 492/7 |
| 5,928,121 | A | * | 7/1999 | Stotz et al. ..................... 492/7 |
| 5,984,847 | A | * | 11/1999 | Brown et al. ................... 492/7 |
| 6,409,644 | B1 | * | 6/2002 | Van Haag ....................... 492/7 |

FOREIGN PATENT DOCUMENTS

| DE | 2942002 | | 6/1982 |
| DE | 3325385 | | 11/1988 |
| DE | 4015237 | | 5/1991 |
| DE | 4011364 | | 2/1992 |
| DE | 29600046 | * | 4/1997 |
| EP | 0365523 B1 | * | 8/1993 |
| EP | 0332594 | | 12/1993 |
| WO | WO 88/07634 | * | 10/1988 |
| WO | WO 9605367 A2 | * | 2/1996 |

* cited by examiner

*Primary Examiner*—I Cuda-Rosenbaum
(74) *Attorney, Agent, or Firm*—Greenblum & Bernstein, P.L.C.

(57) ABSTRACT

Deflection controlled roll that includes a rotatable roll jacket, a rotationally fixed carrier arranged within the roll jacket, and a hydraulic support element arrangement positioned between the carrier and the roll jacket. A closed bearing ring is located in an end region of the roll jacket and is movable relative to the carrier in a press plane, and a bearing arrangement is positioned between the bearing ring and the roll jacket. The bearing arrangement includes at least two hydrostatic support elements which are mutually spaced in a peripheral direction and at least one of the at least two hydrostatic support elements is movable relative to the carrier. At least one force generating device is positioned between the carrier and the roll jacket and is arranged to act generally radially in the press plane. The at least one force generating device is located to radially penetrate the bearing ring.

27 Claims, 3 Drawing Sheets

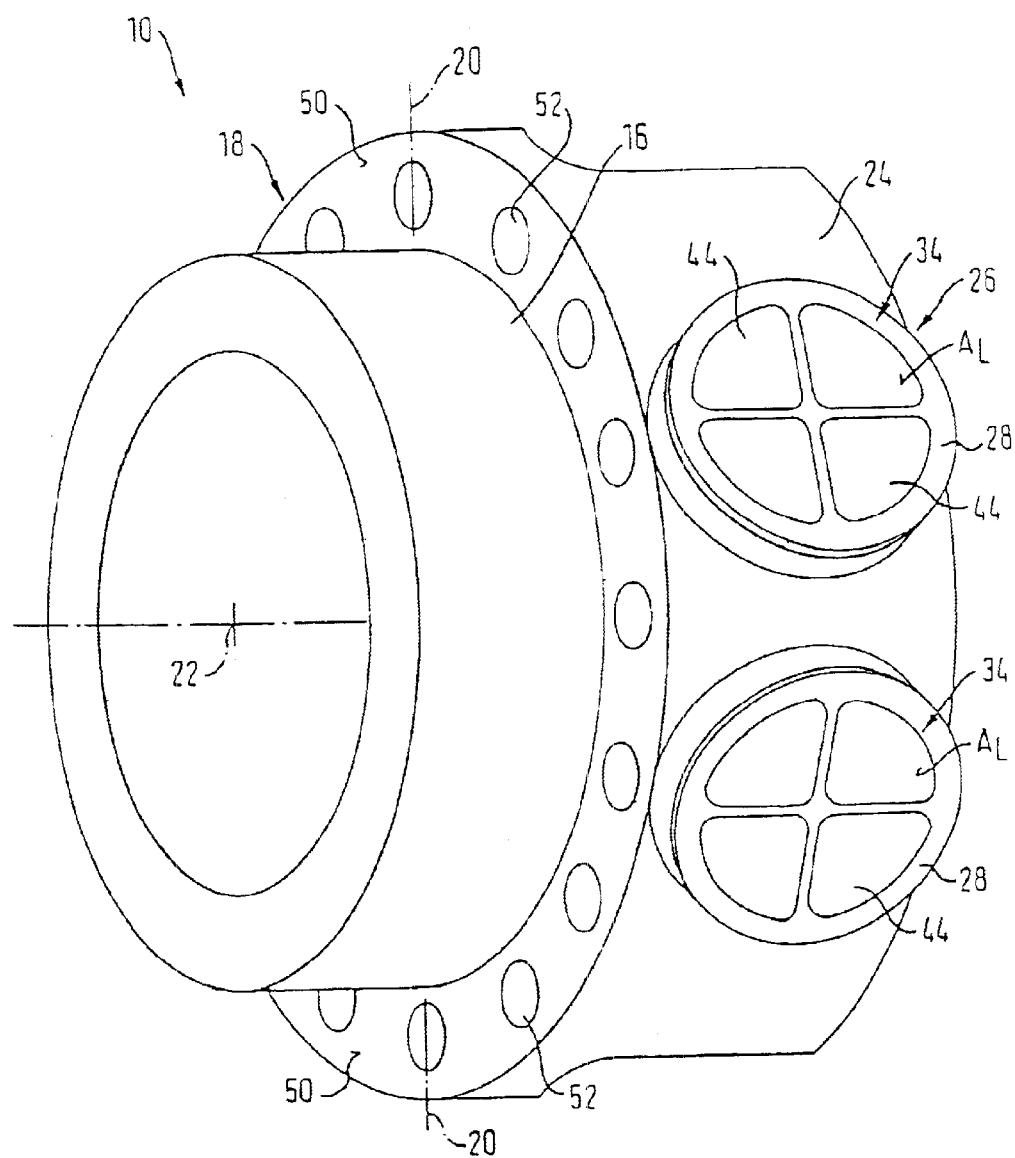

DEFLECTION CONTROLLED ROLL WITH FORCE GENERATING DEVICE

CROSS-REFERENCE TO RELATED APPLICATIONS

The present application claims priority under 35 U.S.C. §119 of German Patent Application No. 100 50 596.1, filed on Oct. 12, 2000, the disclosure of which is expressly incorporated by reference herein in its entirety.

BACKGROUND OF THE INVENTION

1. Field of the Invention

The instant invention relates to a deflection controlled roll having a rotatable roll jacket and a rotationally fixed carrier arranged within the roll jacket. A hydraulic support element arrangement is positioned between the carrier and the roll jacket, and a closed bearing ring is provided in a respective end region of the roll jacket and is movable in a press plane relative to the carrier. A bearing arrangement is positioned between the bearing ring and the roll jacket.

2. Description of Related Art

Such a deflection controlled roll is known from, e.g., EP 0 332 549B 1. The roll jacket rotates around the rotationally fixedly supported carrier in operation. Deflections resulting on an appropriate loading of the roll jacket are absorbed by the hydraulic support element arrangement. This supports the roll jacket with respect to the carrier from the inside. While a deflection of the carrier can also occur here, the elastic line of the roll jacket can be appropriately better influenced.

The support element arrangement can, however, only absorb forces which act in a press plane extending through the press gap or nip formed with a counter surface. The relevant forces can therefore be produced, for example, by a counter-roll or a roll stack downstream thereof. In addition, the roll jacket must be held on the carrier by a bearing which permits a rotation of the roll jacket with respect to the carrier and simultaneously allows a certain jacket positioning.

The relevant bearing arrangement is now exposed to different loads in different situations. The roll jacket is supported by the hydrostatic support elements with respect to the carrier in operation. The bearing arrangement can thus be held practically free of support forces at least with a vertically aligned roll stack in which the support elements between the carrier and the roll jacket also produce a vertically aligned force component. The roll jacket's own weight and the forces applied by the other rolls and acting in the press direction are absorbed by the support elements between the roll jacket and the carrier. The bearing arrangement in this case serves practically exclusively for the positioning of the roll jacket with respect to the carrier. If, in contrast, the press nip of the roll stack is opened, then the weight of the roll jacket rests on the bearing arrangement. In this case, the bearing arrangement must be able to absorb the jacket weight, and indeed also with a rotating roll jacket. It must in all cases be ensured that the bearing arrangement runs with as little play as possible which may not exceed a pre-determined measure.

With the previously known deflection controlled rolls of the kind initially mentioned, the bearing is formed by roll bodies. Such roll bearings, however, now have the disadvantage that they no longer work with the required reliability with the rolls which run increasingly faster.

SUMMARY OF THE INVENTION

The invention present invention provides an improved deflection controlled roll of the kind initially mentioned which is safe and works reliably in particular also at higher operating speeds.

Accordingly, the invention includes a bearing arrangement having at least two hydrostatic support elements which are mutually spaced in the peripheral direction and of which at least one is movable relative to the carrier; and in that at least one force generating device, which acts generally radially in the press plane and radially penetrates the bearing ring, that is arranged between the carrier and the roll jacket.

It is possible due to this embodiment to operate a respective deflection controlled roll with a jacket stroke also at higher speeds, that is at peripheral speeds in the order of magnitude of, e.g., about 2,000 m/min. A defined support is possible in different radial directions by an appropriate distribution of the support elements associated with the bearing arrangement, with additional forces being able to be applied to the roll jacket in the bearing region via the force generating device penetrating the bearing ring. Since at least one, preferably more or even all support elements, can be movable with respect to the bearing ring, they are in a position to adjust themselves even with diameter changes of the roll jacket and/or of the bearing ring or of the carrier, which by no means have to develop in the same way, and thus to ensure that the roll jacket is always supported to the desired degree. Play such as is known from rolling bearings and which can result in an unfavorable vibration behavior in operation under certain circumstances, is kept extremely small with this kind of support. The hydrostatic support of the roll jacket in the region of the rotation bearings furthermore allows relatively low-wear operation, and indeed also at higher speeds.

While in a press roll known from, e.g., DE 29 42 002 C2, a support ring having hydrostatic support elements arranged at its periphery is already provided, this support ring is arranged in a middle roll region. Moreover, this support ring is stressed by force generating devices arranged between it and the carrier.

In a preferred practical embodiment of the deflection controlled roll of the invention, at least one hydrostatic support element each is provided at both sides of the press plane, with in particular at least two such support elements each being provided at each side.

It is also advantageous if at least some of the hydrostatic support elements are arranged pair-wise at mutually opposite bearing ring sides and the two support elements of each pair have mutually opposite radial directions of effect.

In a further appropriate embodiment of the deflection controlled roll of the invention, two force generating devices acting in opposite radial directions are provided on mutually opposite carrier sides.

Preferably at least one force generating device is formed by a respective hydraulic piston-in-cylinder arrangement.

The bearing ring is expediently rigidly designed. It is advantageously dimensioned such that a ring gap remains between the carrier and the bearing ring when these are in a mutually coaxial arrangement. As a consequence of the rigid, closed bearing ring, the forces occurring with any roll deformations are transferred via this ring from the one side to the other and from there again to the roll jacket without a support at the inner carrier occurring. A kind of expanding ring is formed by which the roll jacket is expanded. A support at the inner carrier should therefore not normally take place. A support of the bearing ring at the carrier can only take place with occurring tangential forces and tilt movements accompanying these and with other forces acting from the outside. Corresponding external forces can occur, for example, with a horizontal roll arrangement having overhead stabilizing elements which carry the roll weight and with the use of an external scraper, by which, however, only minor forces are produced.

In a preferred practical embodiment of the deflection controlled roll of the invention, the movable support element has a bearing pocket arrangement whose effective surface is larger than a surface of the support element onto which a pressure between the bearing ring and the support element is effective. It is thereby ensured that while the support element can be pressed into the bearing ring with a certain force when appropriate forces act on the roll jacket, the force with which the support element contacts the bearing ring is limited since hydraulic pressures build up above and beneath the support element. The magnitude of said force can be influenced by the surface difference. Thus, a stable support results even with changing diameters of the roll jacket. It is practically ensured that the roll jacket always slides on a fluid film.

The support element can preferably be moved into the bearing ring up to the lock position under load. Since no relative movement arises between the ring side end face of the support element and the bearing ring which results in friction, such a moving in of the support element "up to the abutment" can be accepted. The roll jacket is supported in operation, for example, by the support elements between the carrier and the roll jacket or also by further rolls which are arranged beneath the roll jacket and which form a nip with the deflection controlled roll. In this case, the bearing arrangement is practically free of external support forces. It mainly serves to position the roll jacket with respect to the carrier. It is possible as a result of the at least one movable support element between the bearing ring and the roll jacket to design the bearing arrangement with very low play. The support elements can also be held in direct proximity to the inside of the roll jacket while forming a fluid film of the hydraulic fluid.

In a preferred practical embodiment of the deflection controlled roll of the invention, the bearing packet arrangement is connected to a supply device which provides a constant volume flow of hydraulic fluid, with the bearing pocket arrangement expediently being connected to a pressure space provided between the support element and the bearing ring via a capillary arrangement penetrating the support element.

As a result of the supply of the bearing pocket arrangement with a constant volume flow, the pressure above the relevent support element increases as the load increases so that an equilibrium of forces again comes about, with a constant pressure loss resulting between the pressure space beneath the support element and the pocket arrangement on its surface by the capillary arrangement penetrating the support element. For this reason, the pressure in the pressure space under the support element also increases as the pocket pressure increases. For the event of a support element moved into the bearing ring up to the lock position under a load, this again means that the force which is applied by the contact of the support element at the base of the pressure space is in any case very small. It depends on the ratio of the effective surface of the bearing pocket arrangement to the pressure-loaded surface of the support element at the side of the bearing ring. With a usual surface ratio of, e.g., about 1:1, the contact force only amounts to about $\frac{1}{10}$ of the support source force or support element force. Thus, it can be ensured by the constant volume flow—independent of the respective load—that the support function is maintained for each support element, and indeed also when the support element is moved into the bearing ring up to the lock position. It is accordingly always ensured that a fluid film is maintained between the support element and the roll jacket.

The capillary arrangement is preferably dimensioned such that a predetermined pre-tension force is not exceeded in the unloaded state, but that a predetermined gap height is ensured with a pre-determined load. The unloaded state can be easily determined. The capillary arrangement is dimensioned such that a sufficient quantity of hydraulic fluid can flow to the bearing pocket arrangement in the unloaded state so that the pressure in the pressure space does not exceed a pre-determined value. Too high a strain of the roll jacket in the unloaded state is thus prevented. Vice versa, the restriction resistance of the capillary arrangement may not be too small so that it is ensured at any load that a gap having a pre-determined order of magnitude is maintained between the support element and the roll jacket.

The supply device can in this respect be matched to the capillary arrangement, for example, such that a minimum gap in the region of, for example, about 20 to about 30 $\mu$m results between the support element and the roll jacket at maximum load. Such a gap is sufficient to prevent damage to the roll jacket by setting down on the support element. However, it is tight enough to sufficiently restrict the oil flow through the support element so that the fluid consumption is kept in an acceptable range.

It is also of advantage if the movable support element(s) have a lift with respect to the bearing ring in the radial direction which corresponds at least substantially to a maximum change resulting from thermal diameter differences and/or roll jacket deformations or carrier deformations due to nip loads. Therefore, the lift can be restricted to very small values.

The stroke must only be so large that it can compensate the changes which result from thermal diameter differences and deformations of the roll jacket or of the axles due to nip loads. The stroke of a respective support element can in particular correspond roughly to the bearing play of a conventional rolling bearing. This lift can, for instance, be in a range from, e.g., about 0.1 to about 0.5 mm, which substantially corresponds to the play of a C3 self-aligning roller bearing, with it being ensured by the lift that just no play occurs with the support in accordance with the invention.

In an appropriate embodiment, the ring-side end face of at least one support element is bent. Such an embodiment is expedient in particular when the relevant support element is moved into the bearing ring up to the lock position with a corresponding load. It is avoided by the bent support surface that the support element contacts the base of the cylinder space or of the pressure space with an edge when the carrier is bent by a corresponding load. Thus, the wear is correspondingly reduced. Furthermore, a hydrostatic bearing results for a roll with jacket stroke which meets the demand of a bending carrier in a relatively good manner. The support element moved into the bearing ring can roll off on the base of the cylinder space or have areal contact in the base region of the cylinder space despite the possibility of an inclination. The support element can, for instance, be arranged in a cylinder space, e.g., whose base is bent or curved in a complementary manner with respect to the end surface of the cylinder element. The complementarily bent or curved base surface can be formed, e.g., by an appropriate insert in the relevant cylinder bore.

However, it is also possible to arrange the relevant support element in a cylinder housing which has a concavely arched base which is supported on a correspondingly convexly curved surface at the carrier. In this case, too, a full-area support is optionally achieved while maintaining the possibility of an inclination.

It is of advantage if a bearing ring is preferably axially supported at the roll jacket at its side facing the relevant roll end via at least on a hydrostatic support element. The bearing ring can alternatively or additionally axially contact the roll jacket via hydrostatic slide surfaces. A fixed bearing can be realized at the relevant axial roll end in this manner. The bearing ring is expediently supported at the carrier in a tiltable and/or radially movable manner at its opposite side.

A spring, which can in particular be a disk spring, is advantageously arranged between at least one movable support element and the associated bearing ring. As already mentioned, the support elements are preferably subjected to a constant volume flow which also enters into the bearing pockets. The support elements preferably only have a low stroke in the bearing ring, which corresponds, e.g., roughly to the bearing play of a conventional rolling bearing. In the event of a sufficiently large applied bearing force, the loaded support elements move into the bearing ring to abutment or into the lock position. In this case, the pressure above the support element increases until the equilibrium of forces is reached. Since the pressure under the support elements also increases due to the constant volume flow, the contact force of the support element at the bearing ring is very small in proportion to the overall force which the support element absorbs. As already mentioned, it depends on the ratio of the effective area of the bearing pocket arrangement and the ring-side end face of the support element subjected to pressure. With a usual surface ratio of, e.g., about 1.1, the contact force only amounts to about 10% of the support element force. It is possible by this big ratio of transmission to take up the force absorption under the support element by a commercial elastic spring, e.g., a disk spring, which—as results from the following—provides a series of further advantages.

The spring characteristic of the bearing can be individually designed by an elastic bedding of the support elements. A support element which can move freely produces a constant support force with a constant volume flow over the path. If the support element moves against a rigid abutment, the forces can increase without a practical change in path. With the bedding of the support element on a spring, a linear force path characteristic is obtained. If the spring is already biased during the assembly of the individual bearing parts, a play-free bearing is obtained.

In this respect, the respective support element can have, e.g., an abutment movable parallel to the spring, which comes into contact with the bearing ring after a predetermined spring path. The force path characteristic of the support element can be individually designed with this embodiment. With a bedding of the support element on a spring, the already mentioned linear force path characteristic is obtained. If the support element moves, in contrast, into the lock position in which the abutment comes into contact with the bearing ring, then the forces can increase without a practical path change. A spring characteristic can therefore be set in wide limits by a combination of these two cases.

If the maximum spring path is, e.g., shorter than the maximum stroke of the support element, then a further property can be integrated into the force path development. A support element that can move freely namely produces a constant application force over the path. Therefore, if the force path ratios are combined with the constant power force development, then three different sections can already be realized in the force path relationship.

Accordingly, the instant invention is directed to a deflection controlled roll that includes a rotatable roll jacket, a rotationally fixed carrier arranged within the roll jacket, and a hydraulic support element arrangement positioned between the carrier and the roll jacket. A closed bearing ring is located in an end region of the roll jacket and is movable relative to the carrier in a press plane, and a bearing arrangement is positioned between the bearing ring and the roll jacket. The bearing arrangement includes at least two hydrostatic support elements which are mutually spaced in a peripheral direction and at least one of the at least two hydrostatic support elements is movable relative to the carrier. At least one force generating device is positioned between the carrier and the roll jacket and is arranged to act generally radially in the press plane. The at least one force generating device is located to radially penetrate the bearing ring.

In accordance with a feature of the instant invention, the at least two hydrostatic support elements can be provided on opposite sides of the press plane. The at least two hydrostatic support elements may include at least two support elements positioned on each side of the press plane.

The at least two hydrostatic support elements can include a support element pair, in which individual support elements of the support pair may be located on mutually opposite bearing ring sides, relative to the press plane, and may be arranged to act in mutually opposing radial directions.

The at least two hydrostatic support elements may include a plurality of support element pairs, in which individual support elements of each pair can be located on mutually opposite bearing ring sides, relative to the press plane, and can be arranged to act in mutually opposing radial directions.

The at least one force generating device can include two force generating devices arranged at mutually opposite carrier sides, relative to the press plane, which act in opposing radial directions.

According to another feature of the invention, the at least one force generating device may include a hydraulic piston in cylinder arrangement.

In accordance with still another feature of the present invention, the bearing ring can be rigidly designed.

The bearing ring and the carrier can be coaxially arranged to form a ring gap between the carrier and the bearing ring.

According to a further feature of the invention, the support elements can include a bearing pocket arrangement having an active surface larger than a pressure surface of the support element onto which a pressure between the bearing ring and the support element acts. The support elements may be movable into the bearing ring up to the lock position under load. Further, the bearing pocket arrangement may be to a supply device which supplies a constant volume flow of hydraulic fluid. The bearing pocket arrangement can be coupled to a pressure space formed between the support element and the bearing ring through a capillary arrangement arranged to penetrate the support element. Moreover, the capillary arrangement can be formed such that a pre-determined pre-tension force is not exceeded in the unloaded state, and a pre-determined minimum gap height can be ensured with a pre-determined load. Still further, the support elements can be a lift in a radial direction with respect to the bearing ring. The lift may at least substantially correspond to a maximum change which results from at least one of (A) thermal diameter differences and (B) one of roll jacket deformations and carrier deformations due to nip loads.

Moreover, a ring-side end face of at least one of the support elements can be curved. The at least one support element can be arranged in a cylinder space having a base which is curved in a complementary manner to the end face of the at least one support element.

The bearing ring may be axially supported at an end of the roll jacket via at least one of at least one hydrostatic support element and at least one hydrostatic slide surface. The bearing ring can be axially supported at the roll jacket at a side facing the bearing ring end via at least one hydrostatic support element. Further, another bearing ring can be positioned at an opposite end region of the roll jacket, and the another bearing ring may be supported at the carrier in at least one of a tiltable and a radially movable manner.

Further, a spring may be positionable arranged between at least one of the support elements and the bearing ring. The spring can include a disk spring.

The present invention is directed to a deflection controlled roll that includes a rotatable roll jacket, a rotationally fixed carrier arranged within the roll jacket, and closed bearing rings located in an end regions of the roll jacket and movable relative to the carrier in a press plane. A bearing arrangement is positioned between the bearing rings and the roll jacket, and the bearing arrangement includes at least one hydrostatic support element pair arranged so that individual support elements of the pair are positioned on opposite sides of the press plane. At least one force generating device is positioned between the carrier and the roll jacket and arranged to act generally radially in the press plane. The at least one force generating device is located to radially penetrate the bearing ring.

According to a feature of the invention, the individual support elements of the pair can be arranged radially opposite each other.

In accordance with yet another feature of the instant invention, the closed bearing ring may include a movable bearing located at one end region of the roll jacket and a fixed bearing located at the other end region of the roll jacket.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3 is a perspective illustration of the one bearing of the roll recognizable in FIGS. 1 and 3.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
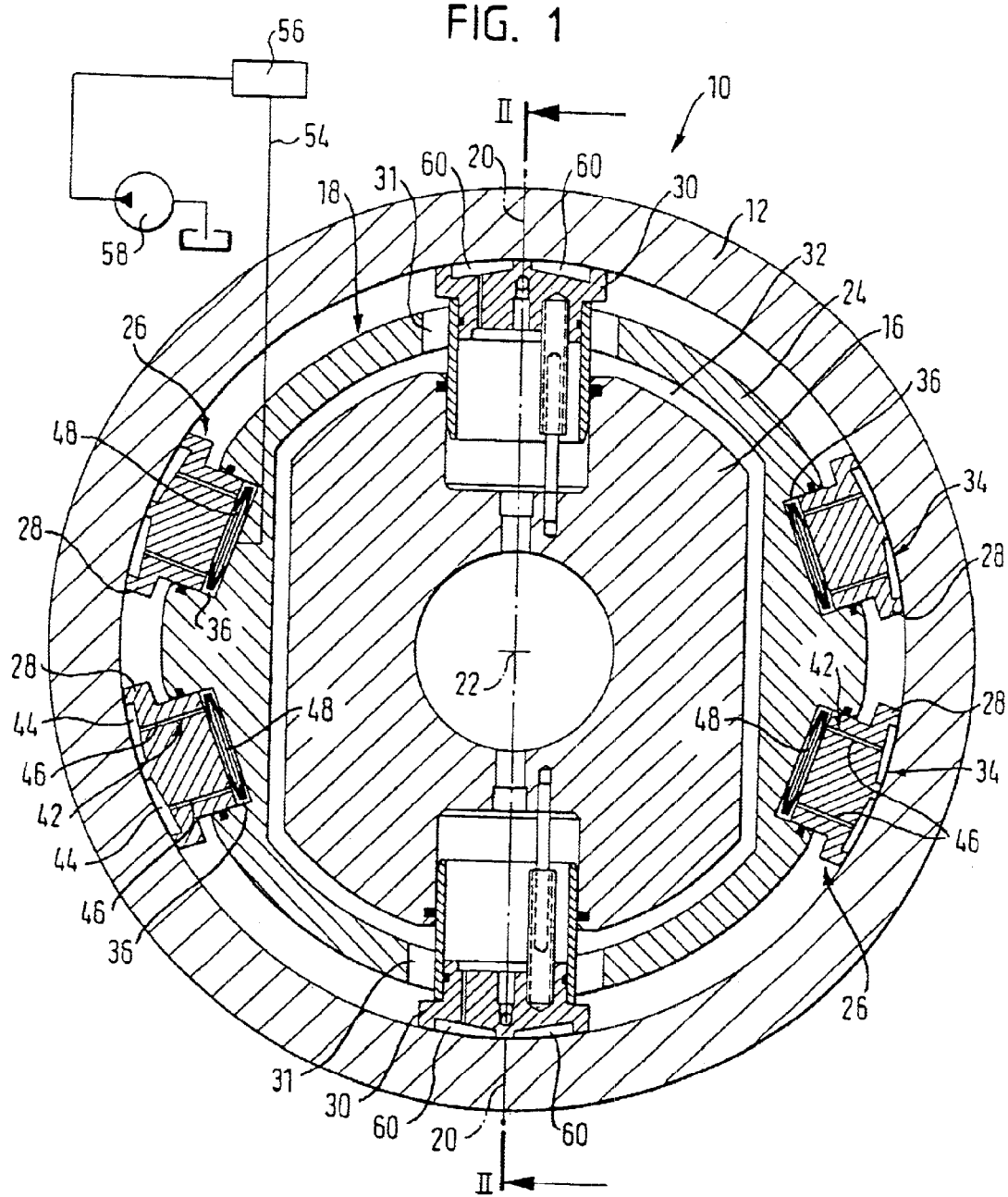
FIG. 1 is a schematic cross-sectional illustration of an exemplary embodiment of a deflection controlled roll, cut along the line II in FIG. 2.
Figure 2:
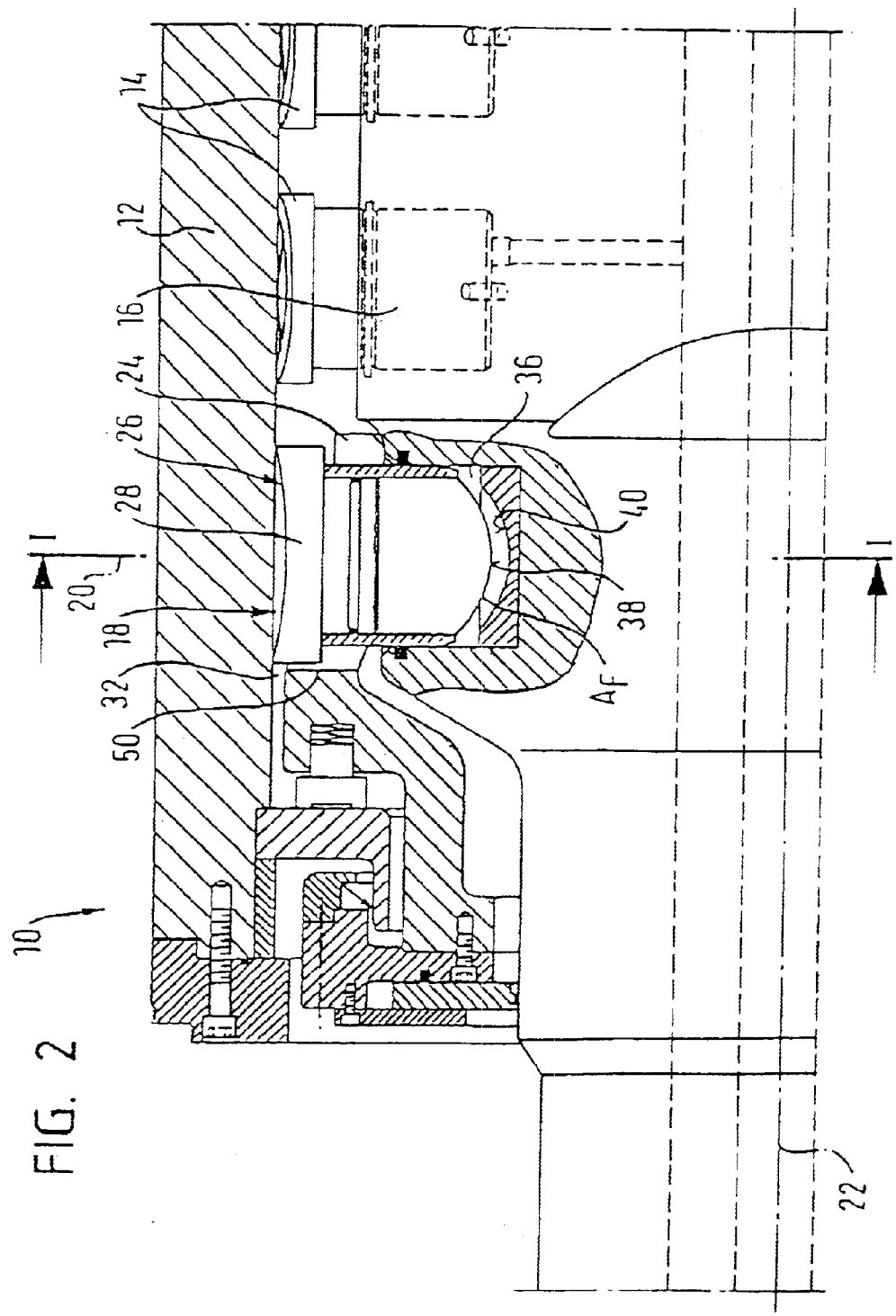
FIG. 2 is a schematic longitudinal illustration of the roll, cut along the line II—II in FIG. 1.

FIGS. 1 to 3 show a deflection controlled roll 10 comprising a rotatable roll jacket 12 which is supported on a rotationally fixed carrier 16 via a hydraulic support element arrangement 14 (cf. FIG. 2). The roll jacket 12 is formed by a roll tube in whose hollow space the carrier 16 is arranged. The roller jacket 12 can rotate about the rotationally fixed carrier 16.

The roll jacket 12 is rotatably supported on the carrier 16 by a bearing in the region of each of its two axial ends. Of these two bearings, only the bearing 18 is depicted in each case in FIGS. 1 to 3, which is on the left-hand side of the illustration in FIG. 2. In this respect, this left hand bearing 18 is formed as a fixed bearing and the other bearing (not shown) as a loose bearing.

Apart from the fact that the one bearing 18 is designed in the present case as a fixed bearing and the other bearing (which is not shown), is designed as a loose bearing, the two bearings can have at least substantially the same setup. Only the left-hand bearing 18 recognizable in FIGS. 1 to 3 is therefore described in more detail in the following.

The roll 10 can form a press gap or nip with a counter surface, formed for example by a counter roll, whereby a press plane 20 is defined which passes through this press gap and the roll axle 22. In particular the hydraulic support element arrangement 14 indicated in FIG. 2 acts in this press plane 20.

In accordance with FIGS. 1 to 3, the bearing 18 comprises a closed bearing ring 24 movable relative to the carrier 16 in the press plane 20.

The roll jacket 12 can therefore be moved upwardly and downwardly with respect to the carrier 16 with respect to FIGS. 1 and 2. Such a roll 10 is also termed a roll with jacket stroke. The movement is therefore realized in that the bearing ring 24 is moved with respect to the carrier 16. The relevant movement of the roll jacket 12 can be controlled via the hydraulic support element arrangement 14.

A bearing arrangement 26 is provided between the bearing ring 24 and the roll jacket 12 which, in the present case, comprises two hydrostatic support elements 28 which are mutually spaced in the peripheral direction and which are positioned on each side of the press plane 20. In the exemplary embodiment, the hydrostatic support elements 28 are arranged pair-wise on mutually opposite bearing ring sides, relative to press plane 20, such that the two support element 28 of each pair act in mutually opposed radial directions, with the support elements 28 each being radially movable relative to the carrier 16.

As can be seen in particular in FIGS. 1 and 2, at least one force generating device 30 acting in a generally radial manner in the press plane 20 and radially penetrating the bearing ring 24 can be arranged between the carrier 16 and the roll jacket 12. In the present embodiment, two such force generating devices 30 are arranged in the region of the bearing ring 18. As can be seen by means of FIG. 1, these are arranged on mutually opposite carrier sides, with them acting in opposite radial directions in the press plane 20. The two force generating devices 30 are formed in each case by a hydraulic piston in cylinder arrangement. As can be seen in FIG. 1, there is relatively large play between the inner periphery of the relevant ring recesses 31 and the pistons of the force generating devices 30.

The bearing ring 24 is rigidly designed and dimensioned such that a ring gap 32 is formed between the carrier 16 and the bearing ring 24 with a mutually coaxial arrangement thereof (cf. in particular FIG. 1).

The movable support elements 28 can each have a bearing pocket arrangement 34 whose effective surface AL is larger than a surface AF of the respective support element 28 onto which a pressure between the bearing ring 24 and the support element 28 acts (cf. in particular FIGS. 2 and 3).

As can be seen in particular from FIGS. 1 and 2, the bearing ring 24 has four cylinder spaces or bores 36 in which one support element 28 each is arranged. The possible stroke of the support elements 28 can be limited to very small regions. It must only correspond to a play of a conventional rolling bearing, for example of a C3 self-aligning roller bearing. It can therefore be in the order of magnitude of, e.g., about 0.1 to about 0.5 mm, preferably even only in the range from about 0.1 to about 0.3 mm. Such a stroke movement is sufficient in order to absorb deformations which result from thermal diameter differences or from roll jacket deformations or carrier deformations which can arise due to nip loads.

As results in particular from FIG. 2, the end face 38 of the support elements 28 which is on the carrier side and is pressure-loaded can be bent or curved, with the support elements 28 each, e.g., being able to be arranged in a cylinder space 36 whose base 40 is bent or curved in complementary manner to the end face 38 of the support element 28 simultaneously forming the surface AF. If the support element 28 is now pressed into the bearing ring 24 up to the abutment due to a corresponding strain of the roll jacket 12, then it is also precluded in the event of a deflection of the carrier 16 that the support element 28 rests on the base of the cylinder space 36 with an edge. An areal contact is rather also ensured in this case.

The bearing pocket arrangement 34 of each support element 28 can be connected to a respective supply device 54–58 which supplies a constant volume flow of hydraulic fluid. The bearing pocket arrangement 34 is in this respect connected to a pressure space 48 provided between the intermediate support element 28 and the bearing ring 24 via a capillary arrangement 42 penetrating the support element 28 and respectively comprising at least one capillary 46 for each bearing pocket 44. The capillary arrangement 42 can in particular be dimensioned such that a pre-determined pre-load force is not exceeded in the unloaded state, but a pre-determined minimum gap height is ensured with a pre-determined load.

As can in particular in FIG. 1, a spring 48, e.g., a disk spring, can be arranged in each case between a respective movable support element 28 and the bearing ring 24.

As can be seen in FIGS. 2 and 3, the bearing ring 24 can be axially supported at the roll jacket 12 on its side facing the relevant roll end, for example, via a plurality of hydrostatic support elements 52 distributed over the periphery and provided at an end face 50 or via at least one hydrostatic bearing surface. The bearing ring 18 is supported at the carrier 16 in a tiltable and/or radially movable manner at its opposite side, with it, for example, slidingly contacting a part pivotable with respect to the carrier 16.

As can be seen by way of FIG. 1, each cylinder space 36 or each pressure space formed therein can be connected to a supply line 54 by which a hydraulic fluid is supplied under pressure. Each supply line 54 can be connected to a joint pump 58, for example, via a controller 56. The controllers 56 ensure that a constant volume flow always enters into the cylinder or pressure spaces 36 via the lines 54 (only one shown in FIG. 1).

In the present case, each support element 28 has four bearing pockets 44. The capillaries 42 each form a restrictor line. A constant volume flow is also produced at least in the sum of the capillaries 42 of a respective support element 28 due to the constant volume flow in each cylinder space 36. Accordingly, the pressure drop over the support element 28 is the same in each case. The pressure drop in the respective capillary 42 can now be selected such that a minimum gap always remains between the radially outer support surface of the support element 28 and the inner side of the roller jacket 12, which can be in a range from, e.g., about 20 to about 30 μm, even under the strongest strain of the roll jacket 12.

In the present case, separate controllers 56 and a joint pump 58 are associated with the support elements 28. It is, for example, also possible for each support element 28 to use its own controlled pump 58.

The bearing ring 24 provided in an end region of the roll jacket 12 can be arranged in a region in which the carrier has a lower maximum outer diameter in comparison to the middle region.

The side support elements 28 serving for stabilization therefore preferably only have a low stroke in the bearing ring 24 which corresponds, for example, roughly to the bearing play of a conventional rolling bearing. In the event of an applied force from outside, the support elements 28 come into contact with the base of the respective cylinder space 36 or into contact with the respective compressed spring 48. Since the support elements 28 are, however, now supplied with a constant volume flow, the pressure above the respective support element 28 increases so that there is again an equilibrium of forces.

The pressure loss between the pressure space 36 beneath the respective support element 28 and the bearing pocket arrangement 34 on the surface of the support element 28 is constant due to the capillary arrangement 42 penetrating the support element 28. For this reason, the pressure also increases in the pressure space under the support element 28 as the pocket pressure increases. This in turn means that the force applied by the contact of the support element at the base of the cylinder space 36 is very small in each case. It depends on the ratio of the active surface AL of the bearing pocket arrangement 34 and the pressure-loaded lower surface AK, that is the piston area of the support element. With a conventional surface ratio of $A_L/A_K$=about 1.1, the applied force is only about 1/10 of the support element force or support source force. It is possible for this reason also to take up the force absorption under a respective support element by a commercial spring such as in particular a usual disk spring. The following advantages result therefrom:

The spring characteristic of the bearing can be individually designed by an elastic embedding of the support elements 28. A support element 28 that can move freely produces a constant support force over the path with a constant volume flow. If the respective support element 28 moves against a rigid abutment, the forces can increase without a practical change in path. With the bedding of a respective support element 28 on a spring 48, a linear force path characteristic is obtained. If the spring 48 is already biased during the assembly of the individual bearing parts, a play-free bearing is obtained.

As can be seen by way of FIG. 1, the force generating devices 30 can in each case also again be provided with hydrostatic bearing pockets 60.

As a result of the preferably rigid, closed bearing ring, the forces occurring with any roll deformations are transferred via this ring from the one side to the other and from there again to the roll jacket without a support at the inner carrier occurring. A kind of expanding ring is formed by which the roll jacket is expanded. A support at the inner carrier should therefore not normally take place. A support of the bearing ring at the carrier can only take place with occurring tangential forces and tilt movements accompanying these and with other forces acting from the outside. Corresponding external forces can occur, for example, with a horizontal roll arrangement having overhead stabilizing elements which carry the roll weight and with the use of an external scraper, by which, however, only minor forces are produced.

Reference Numeral List 10 deflection controlled roll
12 roll jacket
14 hydrostatic support element arrangement
16 carrier
18 bearing
20 press plane
22 roll axle
24 bearing ring
26 bearing arrangement
28 hydrostatic support element
30 force generating device
31 ring recesses
32 ring gap
34 bearing pocket arrangement
36 cylinder space
38 end face
40 base
42 capillary arrangement
44 bearing pocket
46 capillary
48 spring
50 end face 21
52 hydrostatic support element
54 supply line
56 controller
58 pump
60 hydrostatic bearing pocket
AL active face of the bearing pocket arrangement
AK active end face, piston face

What is claimed:

1. A deflection controlled roll comprising:
a rotatable roll jacket;
a rotationally fixed carrier arranged within said roll jacket;
a hydraulic support element arrangement positioned between said carrier and said roll jacket;
a closed bearing ring being located in an end region of said roll jacket and being movable relative to said carrier in a press plane;
a bearing arrangement positioned between said bearing ring and said roll jacket, said bearing arrangement comprising a least two hydrostatic support elements which are mutually spaced in a peripheral direction and at least one of said at least two hydrostatic support elements is movable relative to said carrier; and
at least one force generating device being positioned between said carrier and said roll jacket and arranged to act generally radially in the press plane, said at least one force generating device being located to radially penetrate said bearing ring.

2. The deflection controlled roll in accordance with claim 1, wherein said at least two hydrostatic support elements are provided on opposite sides of the press plane.

3. The deflection controlled roll in accordance with claim 2, wherein said at least two hydrostatic support elements comprise at least two support elements positioned on each side of the press plane.

4. The deflection controlled roll in accordance with claim 1, wherein said at least two hydrostatic support elements comprise a support element pair, in which individual support elements of said support pair is located on mutually opposite bearing ring sides, relative to the press plane, and are arranged to act in mutually opposing radial directions.

5. The deflection controlled roll in accordance with claim 1, wherein said at least two hydrostatic support elements comprise a plurality of support element pairs, in which individual support elements of each pair are located on mutually opposite bearing ring sides, relative to the press plane, and are arranged to act in mutually opposing radial directions.

6. The deflection controlled roll in accordance with claim 1, wherein said at least one force generating device comprises two force generating devices arranged at mutually opposite carrier sides, relative to the press plane, which act in opposing radial directions.

7. The deflection controlled roll in accordance with claim 1, wherein said at least one force generating device comprises a hydraulic piston in cylinder arrangement.

8. The deflection controlled roll in accordance with claim 1, wherein said bearing ring is rigid designed.

9. The deflection controlled roll in accordance with claim 1, wherein said bearing ring and said carrier are coaxially arranged to form a ring gap between said carrier and said bearing ring.

10. The deflection controlled roll in accordance with claim 1, wherein said support elements include a bearing pocket arrangement having an active surface larger than a pressure surface of said support element onto which a pressure between said bearing ring and said support element acts.

11. The deflection controlled roll in accordance with claim 10, wherein said support elements are movable into said bearing ring up to the lock position under load.

12. The deflection controlled roll in accordance with claim 10, wherein said bearing pocket arrangement is coupled to a supply device which supplies a constant volume flow of hydraulic fluid.

13. The deflection controlled roll in accordance with claim 12, wherein said bearing pocket arrangement is coupled to a pressure space formed between said support element and said bearing ring through a capillary arrangement arranged to penetrate said support element.

14. The deflection controlled roll in accordance with claim 13, wherein said capillary arrangement is formed such that a pre-determined pre-tension force is not exceeded in the unloaded state.

15. The deflection controlled roll in accordance with claim 14, wherein a pre-determined minimum gap height is ensured with a pre-determined load.

16. The deflection controlled roll in accordance with claim 1, wherein said support elements comprise a lift in a radial direction with respect to said bearing ring.

17. The deflection controlled roll in accordance with claim 16, wherein the lift at least substantially corresponds to a maximum change which results from at least one of:

(A) thermal diameter differences and (B) one of roll jacket deformations and carrier deformations due to nip loads.

18. The deflection controlled roll in accordance with claim 1, wherein a ring-side end face of at least one of said support elements is curved.

19. The deflection controlled roll in accordance with claim 18, wherein said at least one support element is arranged in a cylinder space having a base which is curved in a complementary manner to said end face of said at least one support element.

20. The deflection controlled roll in accordance with claim 1, wherein said bearing ring is axially supported at an end of said roll jacket via at least one of at least one hydrostatic support element and at least one hydrostatic slide surface.

21. The deflection controlled roll in accordance with claim 20, wherein said bearing ring is axially supported at said roll jacket at a side facing the bearing ring end via at least one hydrostatic support element.

22. The deflection controlled roll in accordance with claim 20, wherein another bearing ring is positioned at an opposite end region of said roll jacket, and said another bearing ring is supported at the carrier in at least one of a tiltable and a radially movable manner.

23. The deflection controlled roll in accordance with claim 1, further comprising a spring being positionable arranged between at least one of said support elements and said bearing ring.

24. The deflection controlled roll in accordance with claim 23, wherein said spring comprises a disk spring.

25. A deflection controlled roll comprising:

a rotatable roll jacket;

a rotationally fixed carrier arranged within said roll jacket;

closed bearing rings being located in end regions of said roll jacket and being movable relative to said carrier in a press plane;

a bearing arrangement positioned between said bearing rings and said roll jacket, said bearing arrangement comprising at least one hydrostatic support element pair arranged so that individual support elements of said pair are positioned on opposite sides of said press plane; and at least one force generating device being positioned between said carrier and said roll jacket and arranged to act generally radially in the press plane, said at least one force generating device being located to radially penetrate said bearing ring.

26. The deflection controlled roll in accordance with claim 25, wherein said individual support elements of said pair are arranged radially opposite each other.

27. The deflection controlled roll in accordance with claim 25, wherein said closed bearing ring comprise a movable bearing located at one end region of said roll jacket and a fixed bearing located at the other end region of said roll jacket.

* * * * *